United States Patent Office 3,183,165
Patented May 11, 1965

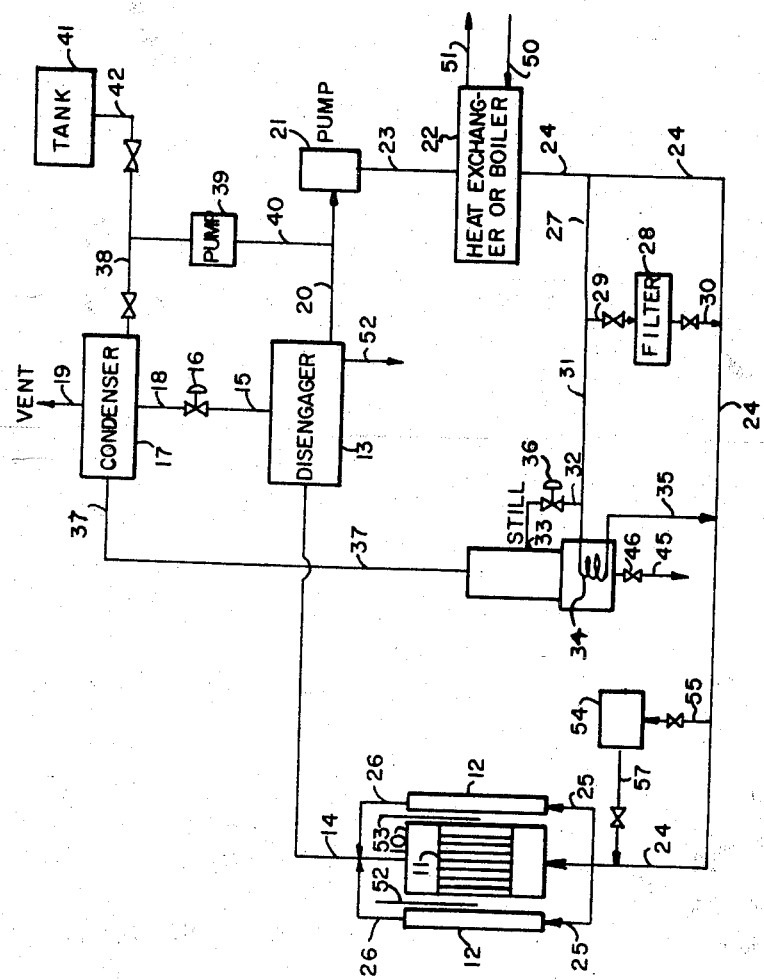

3,183,165
STABILIZATION OF ORGANIC FLUIDS AGAINST RADIATION DECOMPOSITION AND SYSTEMS EMPLOYING SAME
Mark E. Gutzke and William H. Yanko, Dayton, Ohio, assignors to Monsanto Company, a corporation of Delaware
Filed Oct. 10, 1960, Ser. No. 61,774
16 Claims. (Cl. 176—38)

The invention deals with systems employing radiation stable organic fluids, particularly with improvements in the art of cooling and moderating a neutronic reactor using these radiation stable fluids, and with new compositions especially suitable for heat extraction from and moderating purposes within a neutronic power reactor. This application is a continuation-in-part of copending application Serial No. 51,902, filed August 25, 1960, new abandoned.

It has been known for some time that the isotope U–235, occurring in natural uranium to the extent of one part in 139 parts of natural uranium could be fissioned by bombardment with thermal neutrons, resulting in the production of two lighter elements having great kinetic energy, together with approximately two fast neutrons on the average together with beta and gamma radiation. Vast amounts of heat energy are liberated in this reaction, and the recovery and use of such heat has presented attractive possibilities as a use of nuclear power.

The practical generation and recovery of t he "nuclear or atomic" derived heat was, of course, dependent upon the successful solution of the problem of safely inducing and controlling a self-sustaining chan reaction. As is well known to those skilled in the art, this problem was solved by arranging bodies of the fissionable material, usually uranium or enriched uranium in a geometric pattern within a mass of moderator in such fashion that a self-sustaining controllable chain reaction was obtained. The considerable amounts of heat generated in the bodies of fissionable material were removed either by cooling these bodies with a gas or with a suitable liquid. As a result there were developed two general types of neutronic reactors which came to be referred to as "gas-cooled" and "liquid-cooled" reactors.

For the purpose of recovering the heat liberated by the fissioned chain reaction and utilizing such heat in a heat engine of conventional type, the liquid-cooled reactor has received the greatest attention and it is with this type of reactor that this invention is concerned.

Methods for constructing and operating neutronic reactors for carrying out the chain reaction are well known in this art and are described, for example, by Fermi and Szilard in U. S. Patent No. 2,708,656, issued May 17, 1955. The descriptive matter of this patent is by reference incorporated herein and made a part of t his disclosure. According to the disclosure of this patent, either light water ($H_2O$), heavy water ($D_2O$), or diphenyl (biphenyl) may be used as a moderator and coolant in the liquid-cooled reactor.

Attractive possibilities are presented by the use of biphenyl as a reactor coolant. The properties of this material, i.e., its chemical composition consisting only of carbon and hydrogen, and its thermal stability make possible the operation of reactors cooled with this material at temperatures as high as 425° C., or higher for extended periods of time. A major drawback encountered in the use of this material lies in its relatively high freezing (70° C.) or pour point, low boiling point (255° C.), and the fact that some polymerization takes place in the biphenyl as a result of radiolytic damage.

In U.S. 2,902,425, low pour point reactor coolants and moderators are described which are monoisopropylbiphenyls or mixtures of monoisopropylbiphenyls with biphenyl embodying not in excess of 20% by weight of biphenyl in the mixture.

Copending application Serial No. 727,999 filed April 11, 1958, describes reactor coolants and moderators which have advantages over both biphenyl and monoisopropylbiphenyl. These materials are lower alkyl-o-terphenyls and lower alkyl-m-terphenyls or mixtures thereof. Not more than about 50% by weight of lower alkyl-p-terphenyls can be tolerated in admixture with the other isomers and still have sufficiently low pour point.

The surprising discovery has now been made that fused-ring aromatic hydrocarbons act as stabilizers at high temperatures for polyphenyls reducing the formation of polymers and/or other radiolytic damage in polyphenyls subjected to radiation, such as alpha, beta, X- and gamma-rays, neutrons, etc. Preferred compositions comprise mixtures wherein at least 50% by weight of the mixture is polyphenyls. Also it is preferred that the composition of the fused-ring aromatic hydrocarbons added to the polyphenyls contain at least about 50% aromatics. It is further preferred that at least sufficient fused-ring aromatic hydrocarbons be added to polyphenyls to reduce radiolytic damage in the polyphenyls by at least 15%. The further discovery has been made that polycyclic hydrocarbons at least some of which have at least one $CH_2$ group in a ring are especially suitable for use in the presence of radiation at high temperatures, and preferred compositions of this type have from about 3% to about 30%, more preferably from about 5% to about 25%, of the theoretical number of hydrogen atoms required for complete saturation. The radiation-resistant polycyclic hydrocarbons can be made by adding hydrogenated polycyclic hydrocarbons to polyphenyls and/or fused-ring aromatic hydrocarbons, or alternatively by partially hydrogenating polyphenyls and/or fused-ring aromatic hydrocarbons thereby building a stability into the basic aromatic coolant as will be seen in the more detailed discussion of the invention. It is preferred that at least a sufficient amount of hydrogenated polycyclic hydrocarbons be present to reduce radiolytic damage by at least 15% as compared to the basic aromatic coolant. When compositions of the invention are subject to radiation, decomposition products are formed including gases and high boiling polymer products sometimes called high boilers. In a neutronic reactor using the compositions of the invention as moderators and/or coolants these high boilers steadily build up in the fluid, and they can be tolerated up to about 30% in the fluid without a substantial decrease in heat transfer. It is preferred at least for nuclear reactor moderator and/or coolant use that the percentage of high boilers in the fluid not exceed about 50%, more preferably about 40%.

The term "polyphenyls" includes biphenyl, the terphenyls, the quaterphenyls, alkylation products thereof wherein 1 or 2 and only minor amounts of 3 or more lower alkyl groups are added, and mixtures thereof.

The term "fused-ring aromatic hydrocarbons" includes tricyclic, tetracyclic, preferably with only minor amounts of bicyclic aromatics, alkylation products thereof wherein 1 or 2 and only minor amounts of 3 or more lower alkyl groups are added, and mixtures thereof.

The term "polycyclic hydrocarbons" includes polyphenyls, fused-ring aromatic hydrocarbons, compounds which are combination of both, e.g., β-phenyl naphthalene, alkylation products thereof wherein 1 or 2 and only minor amounts of 3 or more lower alkyl groups are added, hydrogenation products thereof, and mixtures thereof.

It is an object of this invention to provide new and useful neutronic reactor moderators and/or coolants stabilized against polymer and other by-products formation due to radiation.

It is another object of this invention to provide a high temperature radiation-stable coolant usable in a system wherein radiation is present.

It is another object of this invention to provide a high temperature radiation-stable hydraulic fluid usuable in a system wherein radiation is present.

It is another object of this invention to provide new low cost neutronic reactor moderators and/or coolants.

It is another object of this invention to provide new low pour point neutronic reactor moderators and/or coolants.

It is another object of this invention to provide new compositions of matter having improved stability when used as neutronic reactor moderators and/or coolants.

It is another object of the invention to provide new compositions stabilized against radiation decomposition resulting in the formation of residue products.

These and other objects of the invention will become apparent as the detailed description of the invention proceeds.

An illustrative but non-limiting listing of polyphenyls which can be stabilized against residue formation from radiation and which are usable neutronic reactor moderators and coolants are the following: biphenyl, o-terphenyl, m-terphenyl, p-terphenyl, 1,3,5-triphenylbenzene, m,m-quaterphenyl, methylbiphenyl, dimethylbiphenyl, ethylbiphenyl, n-propylbiphenyl, isopropylbiphenyl, diisopropylbiphenyl, n-butylbiphenyl, isobutylbiphenyl, diisobutylbiphenyl, t-butylbiphenyl, di-t-butylbiphenyl, amylbiphenyl, hexylbiphenyl, methyl-o-terphenyl, diethyl-m-terphenyl, n-propyl-p-terphenyl, isopropyl-o-terphenyl, isopropyl-m-terphenyl, isopropyl-p-terphenyl, diisopropyl-o-terphenyl, diisopropyl-m-terphenyl, diisopropyl-p-terphenyl, n-butyl-o-terphenyl, isobutyl-o-terphenyl, isobutyl-m-terphenyl, diisobutyl-p-terphenyl, t-butyl-o-terphenyl, t-butyl-m-terphenyl, t-butyl-p-terphenyl, di-t-butyl-o-terphenyl, di-t-butyl-m-terphenyl, di-t-butyl-p-terphenyl, n-amyl-o-terphenyl, n-hexyl-m-terphenyl, etc. The location of the lower alkyl group or groups on polyphenyl rings includes all possible positions and combinations.

Of the compounds named specifically above biphenyl or the terphenyls are desirable in being the least expensive, and they are usable in spite of their higher pour points, although they tend to cause trouble in use with freezing up of lines particularly during temporary shutdowns. Mixtures of the terphenyl isomers, available commercially under the trademark "Santowax R," are quite satisfactory. To obtain coolants and modifiers having low pour point characteristics biphenyl, a terphenyl, or mixed terphenyl isomers are alkylated to preferably add one or two isopropyl or t-butyl groups. Especially desirable as coolants and moderators are mixtures of mono- and di-t-butylated o-, m- and p-terphenyl isomers having not more than about 50% by weight of t-butylated p-terphenyl isomer, which has a relatively high pour point as compared to the o- and m-isomers. "Santowax R" is a suitable raw material source to alkylate in preparing said t-butylated mixture.

As neutronic reactor moderators and/or coolants the polyphenyls named in the two paragraphs immediately above can be used either singly or in admixture with other polyphenyls. The alkylated biphenyls and terphenyls can be made by methods which are illustrated in copending application Serial No. 727,999, filed April 11, 1958, now abandoned. To make methyl alkylated polyphenyl it is desirable in the alkylation process to operate under pressure since methyl bromide is a gas at room temperature. Normally under proper operating conditions, alkylation will result in a mixture which will be primarily monoalkyl- and dialkylpolyphenyls, although minor amounts of tri- and higher polyalkylated products will be formed.

In the polyalkylpolyphenyls the isomeric alkylation product mixture can be used as is for reactor coolants and moderators with the added stabilizer, of course; however, it may be preferred to use distillation to separate out the desired mono- and dialkyl portions. The alkylation process, of course, will result normally in a mixture of isomers wherein the alkyl groups are located in ortho-, meta- and para-positions on the polyphenyl nucleus. The single isomer could be used as neutronic reactor coolants and moderators, but actually it is preferred to use the mixed isomers.

As a source of fused-ring aromatic hydrocarbons usable in the invention still bottoms, aromatic extracts, or a portion of the aromatics therein, can be derived from the catalytic cracking of coal oil fractions, petroleum oil fractions and/or shale oil fractions which are broadly defined as oleaginous materials; however, the preferred source is petroleum fractions at the present time. It is quite conceivable that in time shale oil fractions will be the preferred source as rich crude petroleum oil is used up and/or as shale oil processing is improved, since tremendous deposits of shale useful for the production of oil are known to exist. It is possible although not as likely due to economic consideration that the preferred source will be coal oil fractions derived from hydrogenating or other processing operations on coal to produce crude coal oil. The aromatic extracts in addition to being defined as to source are further defined as being a mixture of compounds comprising fused-ring polycyclic aromatic compounds primarily tricyclic and higher polycyclic with minor amounts of bicyclic nuclei. These compounds or some of them will in some cases have alkylated substituents on the rings, particularly methyl groups; and, they will in some cases be compounds having fused heterocyclic rings with sulfur or nitrogen as components of the hetero ring.

The crude petroleum or shale oil or coal oil is first distilled and an intermediate boiling range fraction conventionally used for catalytic cracking operations is separated as cracking feed stock. Any petroleum is suitable as starting material, i.e., paraffin-base, mixed-base or asphalt-base crude oil as broadly classified on page 11 of ACS Monograph Series No. 63, "Chemical Refining of Petroleum," second edition (1942), by Kalichevsky and Stagner; however, for our purposes it will normally be preferred to use a low-sulfur crude. Conventionally silica alumina, magnesia alumina, clay catalysts, e.g., acid-activated clays, or other catalytic cracking catalysts are used in finely divided form in so-clled fluid catalytic cracking; however, fixed bed, moving bed, etc., catalytic cracking operation could as satisfactorily be used to produce still bottom oils for extraction to produce the desired extract usable in the invention. For our purposes of course, the type of cracking catalyst is not critical. A typical fluid catalytic cracking process is described in detail in U.S. 2,616,836, including solvent extraction of the still bottoms.

The effluent from the catalytic cracking unit is conventionally fed to a still where a number of fractions are separated such as gasoline, kerosene, light cycle oil, etc. Some of these fractions are recycled to the catalytic cracking units for reprocessing. The crude raw material source usable per se in this invention or for extraction to produce the desirable aromatic mixture usable in the invention is usually the bottoms from the still which typically can contain about 50% paraffinic hydrocarbons and 50% aromatic hydrocarbons. It will be realized that the ratio of paraffins to aromatics can vary depending on the operation of the still as well as the severity of the catalytic cracking operation, but the desired aromatics will in any event be produced to a greater or lesser degree. It should be noted that throughout this application percentages are by weight unless otherwise indicated. The still bottoms from the catalytic cracking operation is called slurry oil and exemplary of the physical properties of this slurry oil are the analysis which is as follows:

SLURRY OIL

| | |
|---|---|
| Boiling range °F__ | 450–800 |
| Sulfur percent__ | 1.34 |
| Aromatics, by sulfonation residue do____ | 50.4 |
| Refractive index, $n_D^{20}$ | 1.5651 |
| Density, 20/4 | 0.9640 |

The above analysis of slurry oil should not be taken as limiting of the properties of slurry oils usable in the invention but rather merely illustrative of a usable slurry oil. Actually it is preferred but not mandatory that the lower end of the boiling range of the slurry oil begin about 550° F. to eliminate lower boiling aromatics which are usable but not as desirable; however, the lower boiling point could be less than 450° F. Also the upper boiling point of 800° F. can either be higher or lower.

The still bottoms called slurry oil are next subjected to a conventional selective solvent extraction process well known in the petroleum processing arts for the purpose of recovering the aromatics which are contained in the extract phase. Typical extraction processes which might be used are the furfural, phenol, Chlorex, nitrobenzene, methyl Cellosolve, sulfur dioxide processes, etc. A number of these processes are described in detail especially with respect to treating lubricating oil in the ACS Monograph described hereinabove, pages 332–337. The furfural extraction process as applied to cracked gas oil is described in detail in U.S. 2,695,262. Cracked gas oil is comparable to slurry oil having a boiling range of about 450–750° F. as compared to slurry oil having a boiling range of about 450°–800° F., and extraction conditions for the slurry oil are roughly comparable.

Normally it would be preferred to carry out the furfural extraction of the slurry oil by continuous extraction; however, batch type multi-stage extraction is also suitable. Typical furfural extraction of slurry oil can be carried out by batch extraction in two steps wherein the raffinate is recontacted with a fresh amount of furfural using a ratio of approximately two parts of oil, by volume, to one of furfural for each step. The furfural and slurry oil are intimately mixed for a period of about 30 minutes with a high speed mechanical stirrer suitably at room temperature, and the raffinate in the second step is treated like the slurry oil. The aromatic-furfural layer, after settling in each step, is drained off, and the furfural removed by distillation, preferably under partial vacuum.

The physical properties of an exemplary aromatic extract of slurry oil are as follows:

AROMATIC EXTRACT

| | |
|---|---|
| Boiling range, 84% endpoint °F__ [1] | 450–800 |
| Sulfur percent__ | 4.9 |
| Aromatics, by sulfonation residue do____ | 93 |
| Refractive index, $n_D^{20}$ | 1.6448 |
| Density, 20/4 | 1.0743 |
| Refractive intercept, $n-d/2$ | 1.1074 |
| Pour point °F__ | +20 |

[1] Actually it would be preferred for the purposes of the invention to extract a slurry oil having a somewhat higher initial boiling point of the order of about 550° F. in order to exclude low boiling aromatics from the aromatic extract.

As in the case of the slurry oil the physical properties of the aromatic extract shown above should not be taken as limiting of the properties of aromatic extracts usable in the invention but rather merely illustrative of a usable aromatic extract. The boiling range of the extract can be broader or narrower than that shown.

The aromatic extract recovered from the furfural extraction can contain as high as 5% sulfur or higher depending on the crude petroleum source from which it was obtained. It is desirable to remove most of this sulfur from the extract prior to use although this is not necessary. Sulfur compounds are found in varying degrees in petroleum depending on the source, e.g., West Texas crude is high in sulfur. Conventional processing means can be used to remove sulfur to the desired low level described below. Most of the sulfur can be removed by hydrogenation of the extract using a catalyst such as cobalt molybdate. It is preferred to carry out such desulfurization in a continuous fashion although it can be carried out in batch operations. For example, subjecting a sample of the extract containing about 5% sulfur to hydrogenation at about 370° C. and 1200 p.s.i.g. for about six hours will reduce the sulfur content of the extract to below about 0.1%. The physical properties of an aromatic extract desulfurized down to 0.1% or less sulfur is as follows:

PARTIALLY DESULFURIZED AROMATIC EXTRACT

| | |
|---|---|
| Boiling range, 89% endpoint °F__ | 400–760 |
| Sulfur, approx. percent__ | 0.1 |
| Refractive index, 20/D | 1.5717 |
| Density, 20/4 | 0.9791 |
| Refractive intercept, $n-d/2$ | 1.0822 |

The physical properties for the partially desulfurized aromatic extract should be taken merely as illustrative of the invention but not limiting thereof. Hydrogen consumption in the desulfurization process is greater than that required for the removal of the sulfur indicating partial hydrogenation of the aromatic compound; however, this material is still totally aromatic in terms of the sulfonation residue test.

The sulfur content of the aromatic extract can be further reduced from the 0.1% by such treatments as sodium treatment or percolation through media such as attapulgus clay, bentonite, etc. For example, a typical sodium treatment experiment might be as follows: 600 ml. of the 0.1% sulfur extract was vigorously stirred with 3 g. of sodium using nitrogen blanketing at 445° F. for two hours. The sodium treated extract was then distilled at high vacuum to give a 90% by volume recovery of a distillate product having a refractive index of $n_D^{20}$ 1.5623 and a density at 20/4 of 0.9729. It is desirable to reduce the sulfur content of the aromatic extract to at least not more than about 0.5%, preferably not more than about 0.1%, and ideally the sulfur content should be not more than about 20 parts per million, particularly if the extract is to be mixed in an equal amount with polyphenyl. Actually, what is desired is that the mixture of polyphenyl and aromatic extract have a sulfur content of not more than about 10 p.p.m. The reason for the desired, although not mandatory, minimum sulfur content is that in the presence of neutrons sulfur tends to produce undesirable radioactive derivatives. If substantial sulfur is present in the aromatic extract it will be necessary to take precautions in disposal of the higher boiling residues formed during the use of the mixture of extract and polyphenyl as a nuclear reactor moderator and/or coolant due to radioactive products.

An aromatic extract similar to that tested in the following tests contained about 5% sulfur which is normally present in the ring structure itself. This extract had a

TABLE 1

|  | Weight percent blank | Weight percent residue [1] | Percent residue reduction |
|---|---|---|---|
| m-Terphenyl (control) | 0.0 | [2] 15.0 |  |
| 0.11% sulfur aromatic extract | 2.9 | 12.1 | 19.3 |
| m-Terphenyl containing 5% based on m-terphenyl of 0.11% sulfur aromatic extract | [3] 0.1 | 12.2 | 18.7 |
| m-Terphenyl (control) | 0.0 | [2] 14.4 |  |
| m-Terphenyl containing 30% based on m-terphenyl of 5% sulfur aromatic extract | [3] 1.3 | 10.1 | 29.9 |
| m-Terphenyl (control) | 0.0 | [2] 14.6 |  |
| 5% sulfur aromatic extract | 4.4 | 16.7 | 0.0 |
| m-Terphenyl containing 5% based on m-terphenyl of 5% sulfur aromatic extract | [3] 0.2 | 12.3 | 15.7 |

[1] This column is corrected to residue due to radiation by subtracting blank.
[2] Differences in the residue values for the m-terphenyl controls are due to slight differences in temperature (all over 300° C.) and in dosage.
[3] This blank represents a calculated blank, not a measured one.

It will be seen from the data above that the 0.11% sulfur aromatic extract is an effective radiation stabilizer for m-terphenyl even in amounts as low as 5% by weight based on the m-terphenyl. Surprisingly, m-terphenyl having 5% of the desulfurized aromatic extract has an appreciable lower residue formation than m-terphenyl and substantially as low a residue formation as the desulfurized extract itself. The aromatic extract itself before desulfurization, i.e., having about 5% sulfur therein, is also a stabilizer for polyphenyls against radiation damage reslting in polymer formation. Also aromatic extracts having sulfur contents as low as 20 p.p.m. are good stabilizers for polyphenyls. The sulfur in the aromatic extract does not prevent the extract from stabilizing polyphenyls against radiation damage. Indications are that more high sulfur (e.g. 5%) aromatic extract would be required to obtain the same degree of stabilization as low sulfur (0.1% or lower) aromatic extract in polyphenyls.

*Example 2*

Residue formation due to radiation experiments were also conducted on a sample of slurry oil prior to aromatic extraction. These experiments were conducted in a manner similar to that described above for the aromatic extract exceptions noted hereinbelow. The particular slurry oil tested had previously 10% light ends removed by distillation and this slurry oil minus the 10% light ends had an initial boiling point of 590° F. and a 90% off boiling point of 824° F. The same source of radiation was used and the same dosage, namely 20 watt-hr./gm., but the slurry oil and control were irradiated at 400° C. rather than 315° C. Distillation of the sample before and after irradiation yielded the following results:

TABLE 2

|  | Weight percent blank | Weight percent residue [1] |
|---|---|---|
| m-Terphenyl (control) | 0.0 | 17.6 |
| Slurry oil | 0.1 | 21.3 |

[1] This column is corrected to residue due to radiation by subtracting blank.

When distillations of irradiated m-terphenyl and slurry oil were run at a somewhat higher heat temperature of 205° C. rather than 170° C., the wt. percent residue due to radiation for m-terphenyl was 16.4 as compared to 16.5 for the slurry oil. Thus, it is seen that slurry oil per se like m-terphenyl is surprisingly radiation stable. The slurry oil like the aromatic extract thereof is a radiation stabilizer for m-terphenyl.

*Example 3*

In an attempt to determine the most radiation stable portion of an aromatic extract of slurry oils, distillate fractions of the 0.11% sulfur aromatic extract of Table 1 were tested for radiation stability. The 0.11% sulfur aromatic extract was vacuum distilled and separated into 10% volume cuts. Of these fractions, cuts 4–9 were subjected to radiation as will be described below. Table 3 below gives some physical properties of these cuts.

TABLE 3

| Cut No. | Percent sulfur | B.P., ° C.[1] | Refractive Index $n_D^{25}$ |
|---|---|---|---|
| 4 | 0.03 | 347–356 | 1.5518 |
| 5 | 0.06 | 356–364 | 1.5600 |
| 6 | 0.11 | 364–374 | 1.5710 |
| 7 | 0.16 | 374–395 | 1.5868 |
| 8 | 0.32 | 395–420 | 1.6091 |
| 9 | 0.16 | 420–470 | 1.6416 |

[1] These boiling points are at atmospheric pressure.

The radiation experiments on the various cuts were conducted in a manner similar to that described above for the whole aromatic extracts with exceptions noted hereinbelow. The irradiation dosage in the first of these experiments was the usual 20 watt-hr./g.; however, in other experiments higher dosages were used. A higher temperature of irradiation was used in these experiments; namely, 400° C., rather than 315° C. The samples were enclosed in pressure-tight containers while being irradiated since the temperature of irradiation for most of the cuts was above the boiling point of the cut. Table 4 below reports the results of the tests.

TABLE 4

[Irradiated to 20 watt-hr./gm. at 400° C.]

| Cut No. | Head distillation,[1] temp., ° C. | Weight percent blank | Weight percent residue [2] |
|---|---|---|---|
| 4 | 170 | 0.0 | 7.4 |
| 5 | 170 | 0.0 | 6.8 |
| 6 | 170 | 0.0 | 8.8 |
| 7 | 170 | 0.05 | 9.1 |
| 8 | 195 | 0.0 | 6.8 |
| 9 | 205 | 0.0 | 5.9 |
| m-Terphenyl | 170 | 0.0 | 17.5 |

[Irradiated to 40 watt-hr./gm. at 400° C.]

| 8 | 205 | 0.0 | 11.8 |
| 9 | 205 | 0.0 | 11.8 |

[Irradiated to 60 watt-hr./gm. at 400° C.]

| 8 | 205 | 0.0 | 18.5 |
| 9 | 205 | 0.0 | 22.5 |

[1] Distillation temperatures used were the lowest to give essentially complete distillation of the blank.
[2] This colum is corrected to residue due to radiation by subtracting blank.

All of the aromatic extract cuts described in Tables 3 and 4 above were fluid both before and after irradiation. The residues formed on irradiation are clear, glassy and homogeneous in appearance and are completely soluble in cold benzene. It appears from the data of Table 4 that the higher boiling cuts of the aromatic extract are the most stable and that they are quite appreciably more stable than the aromatic extract per se—note data in Table 1. This is a very desirable situation since the lower boiling cuts or the whole extract require operation at higher pressures, which at the very least will normally be economically less desirable. Of course, the very substantially improved radiation stability of the higher boiling cuts means that appreciably less residues will be formed during use as neutronic power reactor moderators and/or coolants or for other radiation uses and much less makeup fluid will be required. The aromatics boiling above about 675° F. at atmospheric pressure in the extract of a portion thereof would be quite satisfactory for use in the invention, especially cuts 7, 8 or 9, or a mixture of these cuts. The aromatics fraction boiling between about 700° F. and about 880° F. at atmospheric pressure is a particularly desirable fraction.

*Example 4*

This example shows the testing in a manner similar to Example 1 of a number of the stabilizing additives of the invention. In this example the radiations were carried out using 2 m.e.v. electrons to a total radiation dosage of 20 watt-hr./gm. at temperatures of 316° C. to 400° C. Residue formation was determined in the usual manner with residue comparison being made with pure polyphenyl run under similar conditions. The data are as follows:

TABLE 5

[Stabilizer, 5% in m-terphenyl]

|  | Change in residue, percent |
|---|---|
| Irradiations at 316° C.: | |
| Phenylcyclohexane | −17 |
| Tetralin | −21 |
| Fluorene | −26 |
| Acenaphthene | −19 |
| Hydrogenated terphenyl (completely hydrogenated "Santowax R") | −16 |
| Irradiations at 350° C.: | |
| Fluorene | −20 |
| Acenaphthene | −24 |
| Irradiations at 375° C.: | |
| Acenaphthene | −26 |
| Aromatic extract of slurry oil (completely hydrogenated, no sulfur) | −23 |
| Aromatic extract of slurry oil (desulfurized with simultaneous hydrogenation) | −20 |
| Irradiations at 400° C.: | |
| Acenaphthene | −23 |
| Aromatic extract of slurry oil (desulfurized with simultaneous hydrogenation) | −21 |
| Completely hydrogenated "Santowax R" | −28 |

[Stabilizer, 20% in m-terphenyl]

|  |  |
|---|---|
| Acenaphthene | −44 |
| Aromatic extract of slurry oil (desulfurized with simultaneous hydrogenation) | −49 |

[Stabilizer, 25% in m-terphenyl]

|  |  |
|---|---|
| p-Dicyclohexylbenzene | −51 |

[Stabilizer, 50% in m-terphenyl]

|  |  |
|---|---|
| Irradiations at 400° C.: | |
| Cyclohexylbiphenyl | −49 |
| Diphenylcyclohexane | −51 |

[100% stabilizer]

|  |  |
|---|---|
| Cyclohexylbiphenyl | −37 |
| 20% hydrogenated "Santowax OM" | −69 |
| 13% hydrogenated "Santowax OM" | −54 |
| 5% hydrogenated "Santowax OM" | −44 |

An examination of the data of Table 5 above indicates substantial residue reductions as a result of the use of all of the above radiation stabilizing additives.

*Example 5*

This example shows a comparison of both radiolytic and pyrolytic damage of a number of materials, but in general the experiments were conducted in a manner similar to Example 1. In this example unlike the other examples, total radiolytic losses include gases and volatiles as well as polymer losses; however, it should be noted that residue losses are net losses obtained by the subtraction of a blank for each composition. The radiolysis experiments were carried out at 400° C. to a total radiation input of 20 watt-hours/gram. The pyrolysis experiments likewise were carried out at 400° C. In the usual manner volatiles and polymer products were separated at 170° C./<0.5 mm. of Hg absolute pressure. The data are as follows:

| System | Radiolytic and pyrolytic damage | |
|---|---|---|
|  | Radiolysis, percent | Pyrolysis, percent/day |
| m-Terphenyl | 20.6 | 0.27 |
| 7.38% p-dicyclohexyl benzene in m-terphenyl | 13.3 | 0.49 |
| 13% hydrogenated mixed o- and m-terphenyls [1] | 12.9 | 2.18 |
| 38.55% of 13% hydrogenated mixed o- and m-terphenyls in m-terphenyl [1] | 13.5 | 1.37 |

[1] The 13% hydrogenated terphenyls is a mixture of o- and m-terphenyl isomers hydrogenated to 13% of the theoretical number of hydrogen atoms for complete saturation.

It can be noted from the data in the table above that p-dicyclohexyl benzene provides good radiation stabilization and in addition provides superior stability against thermo-degradation as compared to other samples shown in the table.

*Example 6*

This example describes the use of an indene polymer as the radiation protectant in m-terphenyl. The experiment was carried out in a fashion similar to that described in Example 1 with a total radiation dosage of 20 watt-hour/gram at 400° C. The sample of polyindene used was a commercially available sample called "Cumar" resin P-25.

| System | Residue | |
|---|---|---|
|  | Before irrad. | After irrad. |
| m-Terphenyl | 0 | 19.7 |
| 4.79% polyindene in m-terphenyl | 2.7 | 15.6 |

Net residue formation for the sample containing the polyindene was 12.9%, i.e. 34% less than found for m-terphenyl alone.

USE OF AROMATIC EXTRACT AS A MODERATOR AND COOLANT IN A POWER REACTOR

The particular aromatic extract to be used in this specific embodiment is the 0.11% sulfur extract with an equal amount by weight of "Santowax R." Suitably other aromatic extracts, e.g. 5% sulfur extract, or other polycyclic hydrocarbon stabilizers of the invention can be used instead and in lower percentages, if desired. Also other radiation stable compositions of the invention can be used instead of the specific composition designated. A typical power reactor is illustrated diagrammatically in the flow sheet shown in the accompanying drawing. In the drawing, numeral 10 indicates a cylindrical reactor shell constructed preferably of steel. Within the shell 10 is arranged a reactor core 11, which consists of plates of enriched uranium of such number, size, shape and composition as to be capable of becoming critical upon the addition of the organic moderator-coolant of the invention. Surrounding the cylindrical shell 10 is a cylindrical reflector shell 12, which is also constructed of steel and which contains liquid reflector material. In the reactor core are inserted the usual control systems, indicated by numerals 52 and 53, the construction of which and use thereof is described in the Fermi et al. patent, referred to hereinabove.

Numeral 13 indicates a disengager or gas trap, which is merely a device for separating gas from liquid. The disengager is connected with the reactor shell 10 by pipe 14. The gas which is separated from the liquid coolant in 13 flows out by means of pipe 15, connected to pressure controller 16, which in turn is connected to condenser 17 by pipe line 18. Condenser 17 has a discharge line or vent 19, permitting the discharge of gases to the atmosphere or a storage system.

Liquid coolant flows from disengager 13 through line 20 into pump 21 by means of which the coolant is circulated into and through heat exchanger or boiler 22 via line 23. Leaving heat exchanger 22 by pipe 24 the coolant, now reduced in temperature, is returned to reactor shell 10 by line 24. Branch lines 25 carry the coolant into reflector shell 12 and thence by pipe 26 back into the main stream flowing into pipe 14.

Pipe line 27 carries a small stream of coolant from pipe 24 either into filter 28 via pipe 29, thence returning the flow of filtrate by pipe 30 to the main stream flowing in pipe 24, or by means of pipes 31 and 32 into purification still 33. Heating coil in the reboiler section of still 33 provides the necessary heat for distillation, the liquid returning thence to pipe 24 by means of pipe 35.

Liquid coolant which is fed to still 33 flows through pipe 32 and enters the still first passing pressure reducing valve 36, by which means the flow is controlled to that required to keep the high boiling components at the desired level. Still 33 can operate at reduced or atmospheric pressure. The distillate in vapor form leaves the still by pipe 37 entering condenser 17, where the vapors are liquefied, the liquid resulting therefrom flowing through pipe 38 into pump 39 and being thereby returned by pipe 40 to the main stream flowing in pipe 20. Makeup liquid coolant is introduced into tank 41 and flows by pipe 42 into pipe 38 and thence into pump 39.

Purification still 33 may be operated continuously or intermittently as desired. It is, of course, desirable to keep the high boiling decomposition products in the circulating liquid as low as possible in view of the adverse effects of these products on viscosity and heat transfer. Amounts of such high boiling decomposition products usually in the neighborhood of up to about 30% by weight of the liquid can be tolerated without a substantial decrease in the heat transfer coefficient. After the high boiler content has reached a predetermined value (as determined by distillation of a sample), the purification still is placed in operation and a constant stream of coolant is withdrawn from the system into the still 33 where it is distilled. The distillate passes into condenser 17, where it is condensed and is then returned to the system by means of pump 39 as above described. The high boilers are removed from still 33 by means of pipe 45 containing valve 46.

Heat energy is withdrawn from the liquid coolant circulating in the heat exchanger or boiler 22 in any manner desired. In one method of operation, boiler feed water is introduced by means of pipe 50 and steam is generated under pressure within boiler 22 withdrawn at pipe 51 and supplied to a steam turbine or other prime mover. The condensate produced in the conventional condenser forming part of the prime mover will gain be returned to the boiler. It is, of course, not necessary that water be used, since a suitable thermally stable organic liquid may serve the same purpose and obviate the hazards encountered with accidental leakage of water into the coolant-moderator system. The further utilization of the energy obtained in this manner from a nuclear reactor is well known to those skilled in the art and forms no part of the present invention.

The system is filled with an inert gas such as nitrogen or helium, so as to eliminate traces of air and moisture pending the introduction of the coolant-moderator charge. The system is now loaded with the coolant-moderator by introduction to supply tank 41, from which point it is permitted to flow into and through the pipe lines and various pieces of equipment completely filling the same with the exception of still 33 and condenser 17 which are not filled. The system is filled to the point where the disengager is approximately one half full. Pump 21 is activated, the control devices in the reactor adjusted to release power in such an amount as to raise the temperature of the coolant-moderator in the system to a temperature in the range of about 300 to 350° C., preferably between about 350 and 425° C.; however, it is possible higher temperature will be desirable. Heat is extracted from the heat exchanger or boiler in the manner described above.

Radiolytic damage to the fluid is evidenced by the accumulation of fixed gases in disengager 13 and also by the formation of high boiling hydrocarbons in the liquid. The fixed gases consist of hydrogen and hydrocarbons with the former predominating. As the amount of fixed gas increases in the closed system, the pressure rises to the desired value, after which it is continuously or intermittently withdrawn through pressure control valve 16. Withdrawal of gas is controlled at such a rate so as to maintain the system under a pressure which is sufficiently high as to minimize vapor formation in the hottest part of the system. This hottest part of the system is adjacent to the fuel elements in reactor 11. Decrease of density occurring as a result of increase in temperature will result in some loss of moderation by reason of the fewer hydrogen atoms per unit volume of coolant. Such decrease in moderation will, to some extent, damp out the nuclear reaction and can be compensated by adjustment of control devices. At all events, it is necessary to maintain the gas pressure on the system sufficiently high so that vapor formation will not occur.

The discharge of fixed gases attending the maintenance and the regulation of pressure upon the system will carry out some organic coolant-moderator in vapor form. In order to recover such coolant-moderator the gases are discharged into condenser 17, wherein they are cooled by contact with cooled surfaces maintained at a low temperature by means of cooling water. Condensed liquid organic coolant moderator will be returned by pipe to 38, the valve therein now being opened into the suction side of pipe 39 and thence returned to the circulating system.

The high boiling tar-like material formed concomitantly with the gases by the effect of radiation should also be removed or maintained at a desirably low level. This is done by the withdrawal via lines 27, 31 and 32 and reducing valve 36 of a constant stream of liquid flowing to still 33. Still 33 operates under reduced or atmospheric pressure as a result of which the contents can be boiled by means of a side stream of fluid passing to heating coil 34, located within the reboiling zone of still 33. The distillate leaving the still passes by line 37 also into condenser 17. The condensate is mixed with that derived from the disengager discharger vapors and is then returned by pump 39 to the system.

Removal of solid particles from the interior walls of the system which becomes suspended in and are carried by the circulating liquid is best done by the provision of a filter 28 located in the system as shown in the drawing. Such filter is supplied by line 29 and the filtrate returned by line 30 to the system. The pressure drop across the filter may be overcome by means of a suitable pump installed in either of these lines. By this means the induced radio-activity in the suspended foreign materials in the circulating fluid can be maintained at a low value.

An especially suitable method of providing and maintaining the stabilizer level in the neutronic reactor system is to hydrogenate a portion of the circulating coolant and/or moderator. Referring now to the drawing a hydrogenator 54 is shown with a sidestream of coolant being taken via line 55 as a source of material to hydrogenate. The hydrogenated product is then returned to the system via line 57. This hydrogenation process can be carried on either continuously or batchwise, but it is believed that batchwise operation would normally be preferred for the system. The hydrogenation can be carried out using, for example, a cobalt molybdate catalyst under condition described hereinabove.

Not only are the radiation stable compositions of the invention usable as coolants and moderators in neutronic reactors, but they are also useful as coolants in any system employing radiation wherein the coolant must necessarily be subjected to radiation. Also, the fluids of the present invention can be used for systems employing hydraulic fluids subjected to radiation. Radiation stable hydraulic fluids could be required in large food irradiators, radiation sterilizers, nuclear propulsion systems, etc.

Also, the still bottoms, aromatic extracts, or a portion of the aromatics therein and hydrogenated aromatics of the invention are useful as radiation stabilizers for the poly(oxyphenylene)-benzenes, and particularly for these ethers of the formula

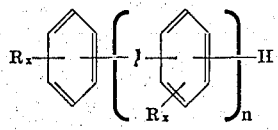

wherein $n$ is an integer from about 3 to about 8, R is an alkyl radical having below about 5 carbon atoms, i.e. methyl, ethyl, n-propyl, isopropyl, n-butyl, isobutyl, t-butyl or mixtures thereof, and $x$ is an integer from 0 to 4. These stabilizers would be incorporated in the polyethers in less than equal amounts by weight based on the polyethers, preferably not more than about 10% by weight, and suitably of the order of about 5% by weight.

Although the invention has been described in terms of specified apparatus and materials which are set forth in considerable detail, it should be understood that this is by way of illustration only and the invention is not necessarily limited thereto, since alternative embodiments and operating techniques will become apparent to those skilled in the art in view of the discloseure. Accordingly, modifications are contemplated which can be made without departing from the spirit of the described invention.

What is claimed is:

1. In a process employing radiation selected from the class consisting of alpha, beta, X-rays, gamma-rays, neutrons and mixtures thereof and a fluid subjected to radiation at high temperatures, the improvement wherein said fluid comprises a mixture of polycyclic hydrocarbons, said mixture having an amount of not more than about 30% of the theoretical number of hydrogen atoms required for complete saturation of said mixture at least sufficient to reduce radiolytic damage as compared to the corresponding unhydrogenated polycyclic aromatic hydrocarbons.

2. A process of claim 1 wherein said mixture has at least about 3% of the theoretical number of hydrogen atoms required for complete saturation of the mixture.

3. A process of claim 1 wherein said mixture has from about 5% to about 25% of the theoretical number of hydrogen atoms required for complete saturation of the mixture.

4. In a process employing radiation selected from the class consisting of alpha, beta, X-rays, gamma-rays, neutrons and mixtures thereof and a fluid subjected to radiation at high temperatures, the improvement wherein said fluid comprises a mixture of polyphenyl hydrocarbons and hydrogenated polycyclic hydrocarbons and a boiling point of not more than 600° C., said polycyclic hydrocarbon being present in said mixture in an amount sufficient to reduce radiolytic damage as compared to said polyphenyl and said mixture having not more than about 30% of the theoretical number of hydrogen atoms for complete saturation of the mixture.

5. A process of claim 4 wherein said fluid comprises a mixture of polyphenyl hydrocarbons and partially hydrogenated polyphenyl hydrocarbons.

6. A process of claim 4 wherein said fluid comprises a mixture of terphenyls and partially hydrogenated terphenyls.

7. In a process employing radiation selected from the class consisting of alpha, beta, X-rays, gamma-rays, neutrons and mixtures thereof and a fluid subjected to radiation at high temperatures, the improvement where said fluid comprises a mixture of fused-ring aromatic hydrocarbons and hydrogenated polycyclic hydrocarbons with the boiling point of said mixture being not more than 600° C., said polycyclic hydrocarbons being present in said mixture in an amount sufficient to reduce radiolytic damage as compared to said fused-ring polycyclic aromatic hydrocarbons and said mixture having not more than about 30% of the theoretical number of hydrogen atoms for complete saturation of the mixture.

8. A process of claim 7 wherein said fused-ring aromatic hydrocarbons are primarily tricyclic and higher polycyclic with minor amounts of bicyclic nuclei and said polycyclic hydrocarbons are a portion of said fused-ring aromatic hydrocarbons which have been partially hydrogenated.

9. In a process employing radiation selected from the class consisting of alpha, beta, X-rays, gamma-rays, neutrons and mixtures thereof and a fluid subjected to said radiation at high temperatures, the improvement wherein said fluid comprises a mixture of terphenyls and not more than 50% by weight of a compound selected from the class consisting of acenaphthene, dicyclohexylbenzene, cyclohexyl biphenyl diphenylcyclohexane and fluorene at least sufficient to reduce radiolytic damage as compared to said terphenyls.

10. In a process employing radiation selected from the class consisting of alpha, beta, X-rays, gamma-rays, neutrons and mixtures thereof and a fluid subjected to radiation at high temperatures, the improvement wherein said fluid comprises a mixture of terphenyls and fused-ring polycyclic aromatic hydrocarbons primarily tricyclic and higher polycyclic with minor amounts of bicyclic nuclei, partially hydrogenated and having a sulfur content of not more than about 0.1%, said fused-ring hydrocarbons being present in said mixture in an amount of not more than 50% by weight at least sufficient to reduce radiolytic damage as compared to said terphenyls, and said mixture having not more than about 30% of the theoretical hydrogen atoms required for complete saturation of said mixture.

11. A process for cooling a neutronic power reactor in which the coolant for the fuel elements comprises a mixture of polyphenyl hydrocarbons and hydrogenated polycyclic hydrocarbons, said mixture having from about 3 to about 30% of the theoretical number of hydrogen atoms required for complete saturation of the mixture.

12. A process of claim 11 wherein said polyphenyl hydrocarbons are terphenyls and said polycyclic hydrocarbons are hydrogenated terphenyls.

13. A process for moderating a neutronic power reactor in which the neutron moderator comprises a mixture of polyphenyl hydrocarbons and hydrogenated polycyclic hydrocarbons, said mixture having from about 3 to about 30% of the theoretical number of hydrogen atoms required for complete saturation of the mixture.

14. In a process employing radiation selected from the class consisting of alpha, beta, X-rays, gamma-rays, neutrons and mixtures thereof and a coolant to regulate temperature, said coolant being subjected to radiation at high temperature, the improvement wherein said coolant comprises a mixture of polyphenyl hydrocarbons and hydrogenated polycyclic hydrocarbons, said mixture having from about 3 to about 30% of the theoretical number of hydrogen atoms required for complete saturation of the mixture.

15. In a process employing radiation selected from the class consisting of alpha, beta, X-rays, gamma-rays, neutrons and mixtures thereof having a hydraulic system to operate the controls, the fluid for said hydraulic system being subjected to said radiation, the improvement wherein said fluid comprises a mixture of polyphenyl hydrocarbons and hydrogenated polycyclic hydrocarbons, said mixture having from about 3 to about 30% of the theoretical number of hydrogen atoms required for complete saturation of the mixture.

16. In a neutronic heating process wherein heat is generated within a liquid cooled neutronic reactor, removed from the fuel elements therein and conveyed to a heat exchanger, said liquid comprising a mixture of polyphenyl hydrocarbons and partially hydrogenated polyphenyl hydrocarbons in at least an amount sufficient to reduce radiolytic damage in said polyphenyl hydrocarbons, and said mixture having not more than about 30% of the theoretical number of hydrogen atoms required for complete saturation of the mixture, the improvement for maintaining the level of said hydrogenated polyphenyl hydrocarbons in said mixture comprising hydrogenating at least a portion of said liquid and returning said hydrogenated liquid to said system.

References Cited by the Examiner
UNITED STATES PATENTS

| | | |
|---|---|---|
| 2,364,719 | 12/44 | Jenkins. |
| 2,708,656 | 5/55 | Fermi et al. _____ 176—41 |
| 2,883,331 | 4/59 | Bolt et al. _____ 252—73 |
| 2,921,891 | 1/60 | Colichman et al. _____ 260—666.5 |

FOREIGN PATENTS 697,601  9/53  Great Britain.

OTHER REFERENCES (AEC) ANL-5121, Engineering Properties of Diphenyl; Anderson; Aug. 11, 1953, pages 2, 3, 4, 5, 13, 14, 15, and 20–27.

(AEC) HW-44054, Organic Reactor Coolant Survey; Trip Report; July 9, 1956, Atwood et al., 28 pages.

TID 7007 (pt. 1), Compilation of Organic Moderator and Coolant Technology, Jan. 24, 1952, article by Beckett, pages 45–48 and 52.

Nucleonics, vol. 15, No. 2, February 1957, pages 72–74.

CARL D. QUARFORTH, *Primary Examiner.*

ROGER L. CAMPBELL, LEON D. ROSDOL,
*Examiners.*

UNITED STATES PATENT OFFICE
CERTIFICATE OF CORRECTION

Patent No. 3,183,165                      May 11, 1965

Mark E. Gutzke et al.

It is hereby certified that error appears in the above numbered patent requiring correction and that the said Letters Patent should read as corrected below.

Column 1, line 18, for "new" read -- now --; line 33, for "chan" read -- chain --; column 12, line 12, for "hydorgenated" read -- hydrogenated --; column 13, line 55, for "gain" read -- again --; column 15, lines 14 to 18, the formula should appear as shown below instead of as in the patent:

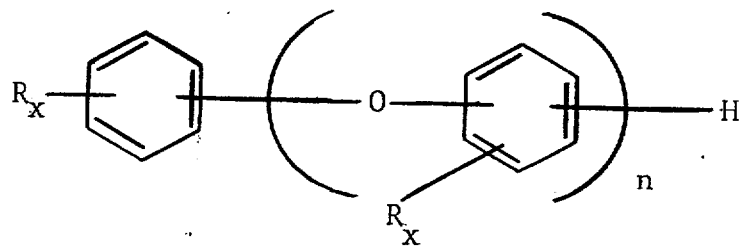

Signed and sealed this 26th day of October 1965.

(SEAL)
Attest:

ERNEST W. SWIDER
Attesting Officer

EDWARD J. BRENNER
Commissioner of Patents